US 11,756,580 B2

United States Patent
Suzuki et al.

(10) Patent No.: US 11,756,580 B2
(45) Date of Patent: Sep. 12, 2023

(54) MAGNETIC DISK DEVICE, CONTROL METHOD, AND NON-TRANSITORY COMPUTER-READABLE STORAGE MEDIUM

(71) Applicants: Kabushiki Kaisha Toshiba, Tokyo (JP); Toshiba Electronic Devices & Storage Corporation, Tokyo (JP)

(72) Inventors: Sho Suzuki, Yokohama (JP); Takayuki Kawabe, Sagamihara (JP); Takeyori Hara, Kawasaki (JP); Daisuke Sudo, Kawasaki (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/690,744

(22) Filed: Mar. 9, 2022

(65) Prior Publication Data
US 2023/0097702 A1    Mar. 30, 2023

(30) Foreign Application Priority Data
Sep. 22, 2021 (JP) .................................. 2021-154909

(51) Int. Cl.
G11B 5/596    (2006.01)
G06F 3/06     (2006.01)
G11B 20/12    (2006.01)

(52) U.S. Cl.
CPC .......... *G11B 5/59688* (2013.01); *G06F 3/0676* (2013.01); *G11B 5/59655* (2013.01); *G11B 20/1217* (2013.01); *G11B 2020/1281* (2013.01)

(58) Field of Classification Search
None
See application file for complete search history.

(56) References Cited

U.S. PATENT DOCUMENTS

| | | | |
|---|---|---|---|
| 3,154,762 A * | 10/1964 | Morphet Jr. | G11B 20/16 382/290 |
| 5,561,566 A * | 10/1996 | Kigami et al. | G11B 5/012 360/48 |
| 5,835,299 A | 11/1998 | Lee et al. | |
| 5,890,209 A * | 3/1999 | Dobbek | G11B 20/1258 360/78.04 |
| 6,040,952 A | 3/2000 | Gaertner et al. | |
| 6,493,171 B2 | 12/2002 | Enokida et al. | |
| 7,092,198 B2 * | 8/2006 | Yamamoto | G11B 5/5534 360/78.04 |
| 2007/0258165 A1 * | 11/2007 | Ahn et al. | G11B 5/59627 360/78.04 |
| 2008/0304173 A1 * | 12/2008 | Albrecht et al. | G11B 5/746 360/51 |
| 2015/0294690 A1 | 10/2015 | Kanamaru et al. | |
| 2016/0217815 A1 | 7/2016 | Kanamaru et al. | |

FOREIGN PATENT DOCUMENTS

JP    2015-204123 A    11/2015

* cited by examiner

*Primary Examiner* — Peter Vincent Agustin
(74) *Attorney, Agent, or Firm* — Allen & Overy LLP (57) ABSTRACT

A magnetic disk device includes a plurality of magnetic heads, a storage unit that stores a table storing, for each of the magnetic heads, a track skew value obtained by adding a head shared value and a head unique value, and a control unit that reads out the track skew value corresponding to one of the magnetic heads to be operated from the table and performs seek control.

9 Claims, 11 Drawing Sheets

| MAGNETIC HEAD | TRACK SKEW VALUE (PER SERVO SECTOR) |
|---|---|
| Hd0 | TskewSv_Hd0 |
| Hd1 | TskewSv_Hd1 |
| Hd2 | TskewSv_Hd2 |
| Hd3 | TskewSv_Hd3 |

FIG.4B

| MAGNETIC HEAD | TRACK SKEW VALUE (PER DATA SECTOR) |
|---|---|
| Hd0 | TskewDat_Hd0 |
| Hd1 | TskewDat_Hd1 |
| Hd2 | TskewDat_Hd2 |
| Hd3 | TskewDat_Hd3 |

| MAGNETIC HEAD | HEAD SKEW VALUE |
|---|---|
| Hd0 | Hskew_Hd0 |
| Hd1 | Hskew_Hd1 |
| Hd2 | Hskew_Hd2 |
| Hd3 | Hskew_Hd3 |

| MAGNETIC HEAD | HEAD GROUP |
|---|---|
| Hd0 | Gr0 |
| Hd1 | Gr1 |
| Hd2 | Gr1 |
| Hd3 | Gr0 |

FIG.12B

| HEAD GROUP | TRACK SKEW VALUE |
|---|---|
| Gr0 | $T_{skew\_Gr0}$ |
| Gr1 | $T_{skew\_Gr1}$ |

MAGNETIC DISK DEVICE, CONTROL METHOD, AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2021-154909, filed on Sep. 22, 2021; the entire contents of which are incorporated herein by reference.

FIELD

Embodiments described herein relate generally to a magnetic disk device, a control method, and a non-transitory computer-readable storage medium.

BACKGROUND

Conventionally, in magnetic disk devices (hard disk drives (HDDs)) having a plurality of heads, in a case where access is performed sequentially as in a sequential operation, the access is performed in the order of logical block addresses (LBAs) each assigned to a sector, such as an n-th sector, an (n + 1)th sector, an (n + 2)th sector,....

In addition, since a magnetic disk is rotating even during the seek, it is necessary to consider the number of sectors that are passed during the seek time when recording is performed across tracks.

For this reason, it is desired to set a track skew with a margin, to minimize the rotation waiting time even when a seek occurs, and to access a next LBA.

Meanwhile, for setting a track skew, a tentative value of the track skew is set for every magnetic disk device, to which a margin considering vibration disturbance received from a server rack or the like is added, thereby setting a track skew suitable for the magnetic disk.

After checking a track skew value that gives the best performance in each magnetic disk device in a vibration disturbance-free environment, a track skew value is set using a time margin TMgn for settling time extension due to the vibration disturbance that was checked in advance.

That is, a track skew value TSkewX corresponding to a magnetic disk device X is set as in the following equation.

$$TSkewX = TSkew\_tempX + TMgn$$

Here, TSkew_tempX is a track skew value that gives the best performance in the magnetic disk device X.

The track skew set having been set in this manner is considered to be the optimum value for the magnetic disk device; however, it is not the optimum value for a magnetic head to be operated, and depending on a magnetic head to be operated, there are cases where the track skew value is excessive or insufficient, thereby deteriorating the effective access performance.

It is preferable to provide a magnetic disk device including a plurality of magnetic heads and capable of accessing a next logical block address (LBA) regardless of which one of the magnetic heads is used for access while minimizing the rotation waiting time, a control method of the magnetic disk device, and a non-transitory computer readable storage medium.

DETAILED DESCRIPTION

According to one embodiment, a magnetic disk device includes a plurality of magnetic heads, a storage unit that stores a table storing, for each of the magnetic heads, a track skew value obtained by adding a head shared value and a head unique value; and a control unit that reads out the track skew value corresponding to one of the magnetic heads to be operated from the table and performs seek control.

Next, embodiments will be described with reference to the drawings.

First Embodiment

Figure 1:
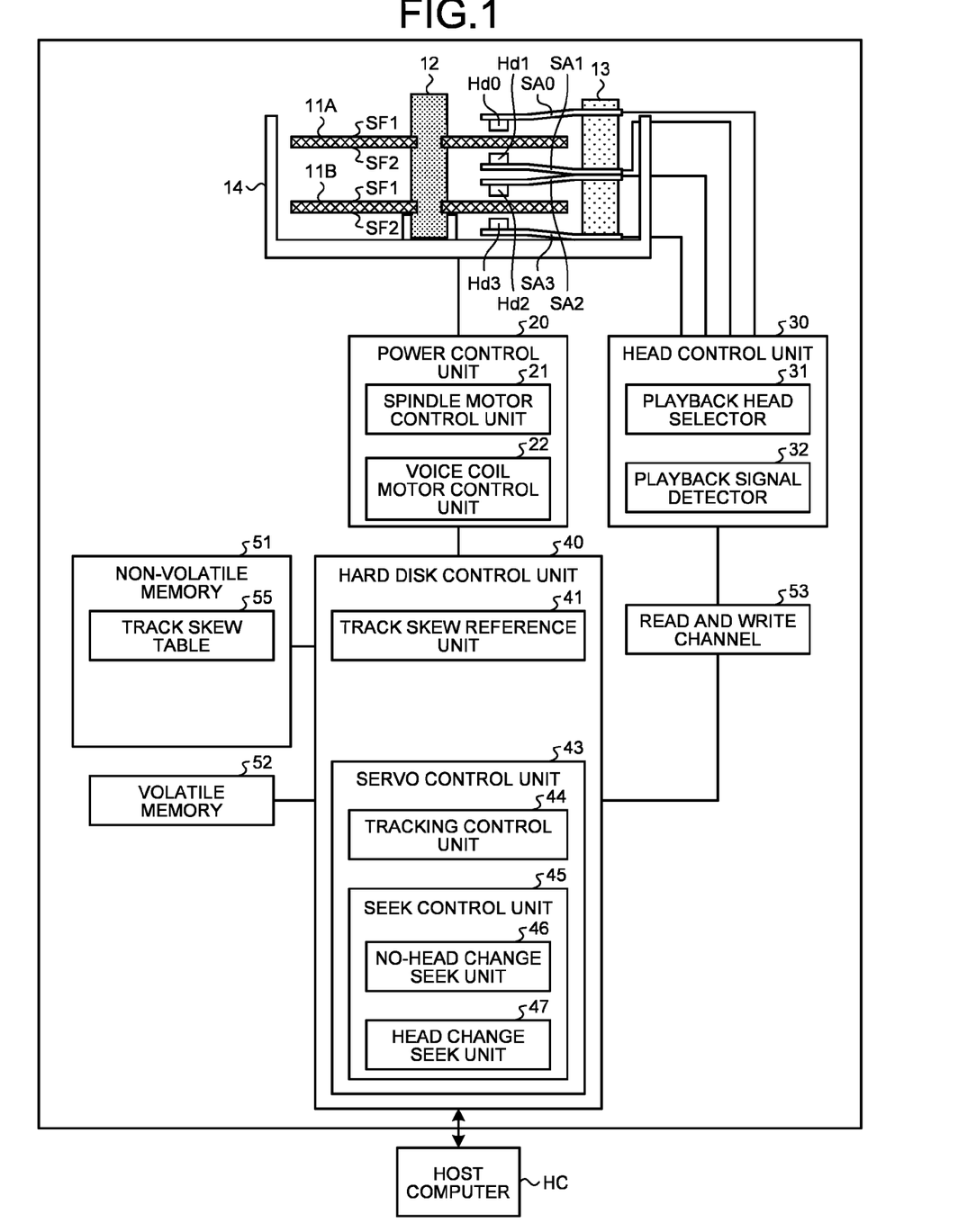
FIG. 1 is a schematic configuration block diagram of a hard disk drive according to a first embodiment.

FIG. 1 is a schematic configuration block diagram of a hard disk drive according to a first embodiment.

In FIG. 1, an example of a hard disk having two platters and four magnetic heads corresponding to the surfaces of the respective platters is illustrated for ease of understanding.

A hard disk drive 10 includes: two platters 11A and 11B; a magnetic head H$d$0 provided on a first surface (upper surface side) SF1 of the platter 11A and supported by a swing arm SA0; a magnetic head H$d$1 provided on a second surface (lower surface side) SF2 of the platter 11A and supported by a swing arm SA1; a magnetic head H$d$2 provided on a first surface (upper surface side) SF1 of the platter 11B and supported by a swing arm SA2; a magnetic head H$d$3 provided on a second surface (lower surface side) SF2 of the platter 11A and supported by a swing arm SA3; a spindle motor 12 that drives the platters 11A and 11B; a voice coil motor 13 that drives the magnetic heads H$d$0 to H$d$3 via the swing arms SA0 to SA3; and a housing 14.

The hard disk drive 10 further includes a power control unit 20, a head control unit 30, a hard disk control unit 40, a non-volatile memory 51, a volatile memory 52, and a read and write channel 53.

The power control unit 20 includes a spindle motor control unit 21 that controls the spindle motor 12 and a voice coil motor control unit 22 that controls the voice coil motor 13.

The head control unit 30 includes a playback head selector 31 that selects a magnetic head for playback from among the magnetic heads H$d$0 to H$d$3 under the control of the hard disk control unit 40 via the read and write channel 53 and a playback signal detector 32 that detects a playback signal of the magnetic head for the playback that has been selected and outputs the playback signal to the hard disk control unit 40 via the read and write channel 53.

The hard disk control unit 40 controls the entire hard disk drive 10 under the control of a host computer HC and includes a track skew reference unit 41 that refers to a track skew table described later and a servo control unit 43.

Here, the servo control unit 43 includes a tracking control unit 44 that performs tracking control and a seek control unit 45 that performs seek control.

Furthermore, the seek control unit 45 includes a no-head change seek unit 46 that performs seek control that does not involve changing magnetic heads and a head change seek unit 47 that performs seek control that involves changing magnetic heads.

The non-volatile memory 51 is configured as, for example, a ROM or an EEPROM and includes a track skew table 55 in which track skews are stored in advance.

The volatile memory 52 is configured as, for example, a RAM and temporarily stores various types of data and programs.

The read and write channel 53 is configured as a communication bus including a control bus and a data bus.

Here, prior to explanation of the operation of the embodiment, the conventional method of setting a track skew value and the problems associated therewith will be explained.

Figure 2:
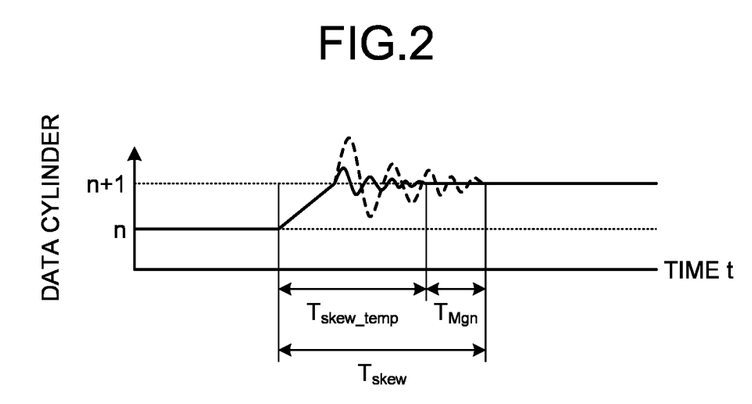
FIG. 2 is an explanatory diagram of a conventional method of setting a track skew value.

FIG. 2 is an explanatory diagram of a conventional method of setting a track skew value.

In FIG. 2, the position history of a magnetic head in a case where the magnetic head is driven from an n-th track to an (n+1)th track to be transferred to an on-track state.

In conventional in-house inspection processes, the track skew value is caused to vary for each hard disk drive in a vibration disturbance-free environment on a basis of a position history of a magnetic head as illustrated by a solid line in FIG. 2 to check and acquire a provisional track skew value Tskew_temp that gives the best performance.

Then, in a hard disk drive of the same model that has been examined in advance, a margin time Tmgn for settling time extension in the vibration disturbance environment as illustrated by a broken line in FIG. 2 is acquired. This margin time Tmgn is a shared value for hard disk drives of the same model.

Then, by adding the provisional track skew value Tskew_temp to the margin time Tmgn, a track skew value Tskew that is unique to each hard disk drive is set.

That is, the track skew value Tskew is set by the following equation as illustrated in FIG. 2.

$$Tskew = Tskew\_temp + Tmgn$$

The track skew value Tskew that has been set is written to the non-volatile memory 51 in the hard disk drive.

Here, as a magnetic head, as illustrated in FIG. 1, the hard disk drive having the four magnetic heads H$d$0 to H$d$3 is assumed.

Figure 3A:
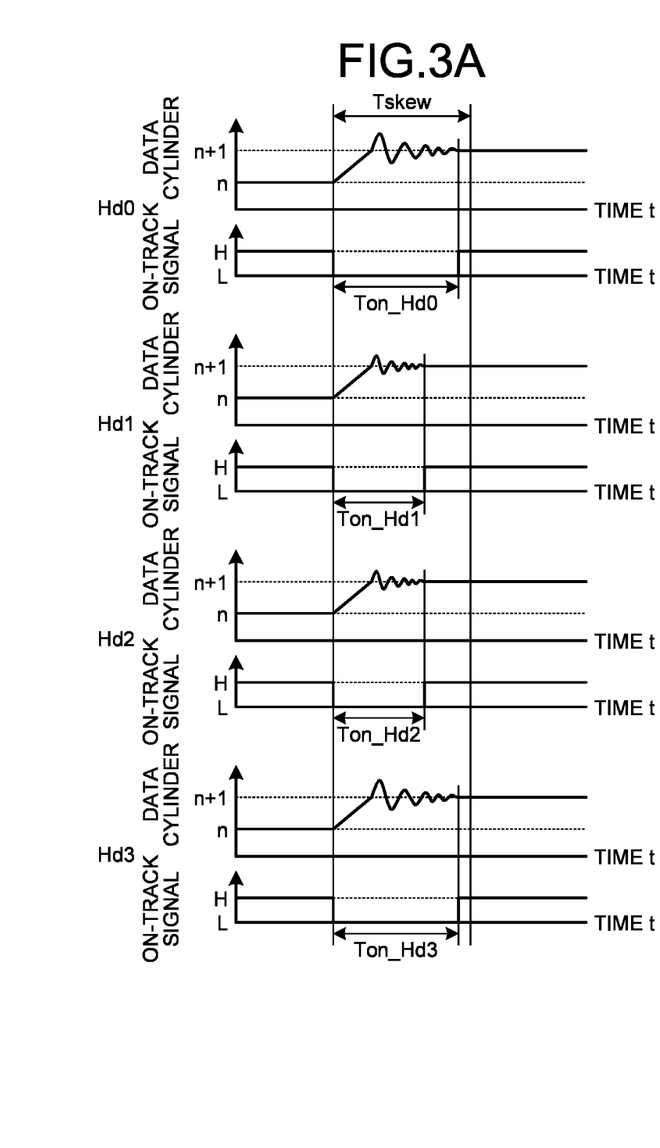
FIGS. 3A and 3B are explanatory diagrams of track skews that have been set and the actual operation.
Figure 3B:
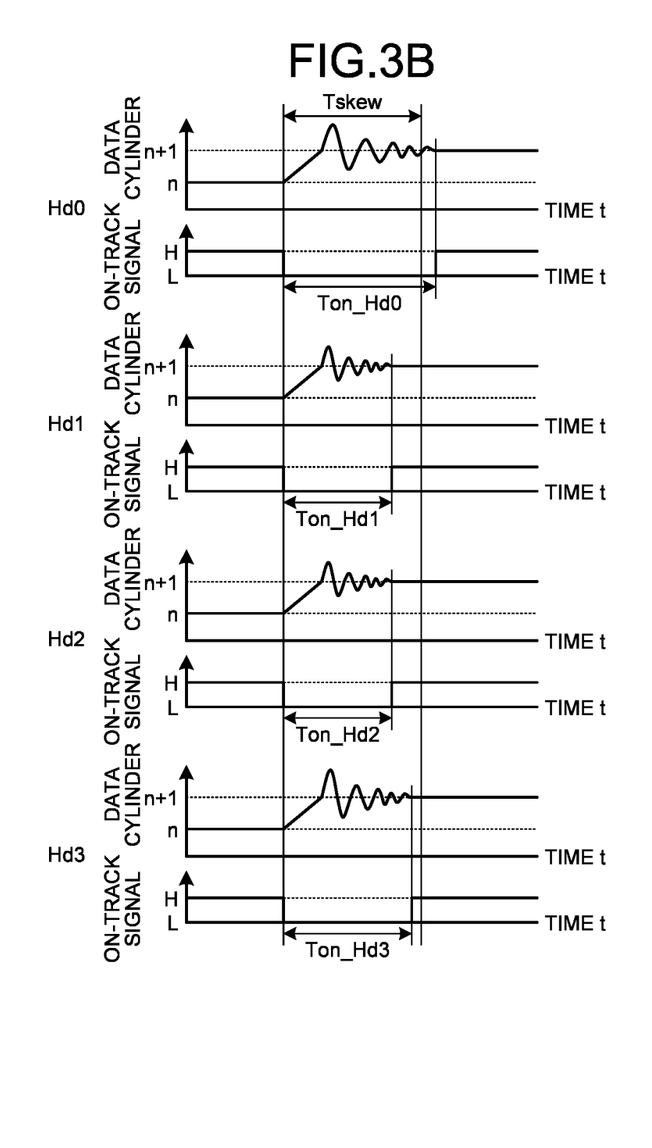

FIGS. 3A and 3B are explanatory diagrams of track skews that have been set and the actual operation.

FIG. 3A is an explanatory diagram of track skews that have been set in a vibration disturbance-free environment.

FIG. 3B is an explanatory diagram of an actual operation state in a vibration disturbance environment.

In this case, it is assumed that the track skew value Tskew is set to a value in which a track has a margin for each of on-track times Ton-Hd0 to Ton-Hd3 of the magnetic heads H$d$0 to H$d$3 as illustrated in FIG. 3A.

As illustrated in FIG. 3B, the position error increases due to the vibration disturbance, and thus the settling time at the time of seeking is extended. Therefore, the on-track times Ton-Hd0 to Ton-Hd3 are also extended.

In this case, the margin time Tmgn is set uniformly to all the magnetic heads H$d$0 to H$d$3. Therefore, in the outer magnetic heads which are not positioned between the platters and has large deterioration in the positioning due to the vibration disturbance, the on-track time extension may occur as the settling time larger than the margin time Tmgn.

More specifically, for example, in the case of the example of FIG. 3B, the on-track time Ton-Hd0 exceeds the time of the track skew value Tskew since the track skew value Tskew is insufficient in the magnetic head Hd0.

On the contrary, in the inner heads positioned between the platters that are relatively less susceptible to vibration disturbance, the settling time extension may be less than Tmgn.

For example, in the example of FIG. 3B, the magnetic heads H$d$1 and H$d$2 have sufficiently short on-track times Ton-Hd1 and Ton-Hd2 with respect to the track skew value Tskew, and the track skew value Tskew is in excess.

In a case where time of the track skew value Tskew is insufficient, the Tskew time has been exceeded by the time when the seek to a target cylinder is completed, and the sector to be accessed has already passed. For this reason, there is a disadvantage that waiting for rotation until the sector to be accessed is reached again occurs, thereby leading to deterioration of access performance.

On the other hand, in a case where the time of the track skew value Tskew is in excess, there is a disadvantage that it is necessary to wait for the disk to rotate until a sector to be accessed is reached after the seek to a target cylinder has been completed, thereby leading to deterioration of the access performance.

Therefore, setting the track skew value Tskew uniformly to the plurality of magnetic heads H$d$0 to H$d$3 has a disadvantage that the difference in the settling time between the outer heads and the inner heads becomes large when vibration disturbance is applied, thereby increasing the possibility of deterioration in the access performance in any of the magnetic heads H$d$0 to H$d$3.

Meanwhile, from the viewpoint of pursuing performance, it is ideal to prepare a vibration-added environment in an in-house inspection process and to obtain separate Tskew_Hd0,..., Tskew_HdN for every drive and every magnetic head.

However, this is not realistic due to the reasons such as that it is necessary to newly prepare a vibration-added environment in the in-house inspection process and that the inspection time takes longer than the current time if adjustment is made for every drive and every magnetic head.

Next, the first embodiment will be described.

In order to solve the above conventional disadvantages, in the first embodiment, margin times Tmgn_Hd0,......, and Tmgn_HdN are checked in advance for magnetic heads (magnetic head number) H$d$0,......, and HdN, respectively, so that it becomes possible to set a track skew value close to the optimum value for every magnetic head simply by addition to the track skew value Tskew that is used in the conventional technology. Furthermore, according to the first embodiment, the time required in an in-house inspection process is similar to the conventional one.

More specifically, in the first embodiment, the track skew table 55 created at the time of design or adjusted at the time of manufacture depending on the settling times is recorded in the non-volatile memory 51 in advance, and the track skew table 55 is loaded to the volatile memory 52 at the time of activation of the magnetic disk.

Then, in the hard disk control unit 40, when access to a data sector is made, the track skew reference unit 41 reads a track skew value corresponding to a head number from the track skew table 55 in the volatile memory and applies the track skew value.

Here, an exemplary structure of a track skew table as a table will be described.

Figure 4A:
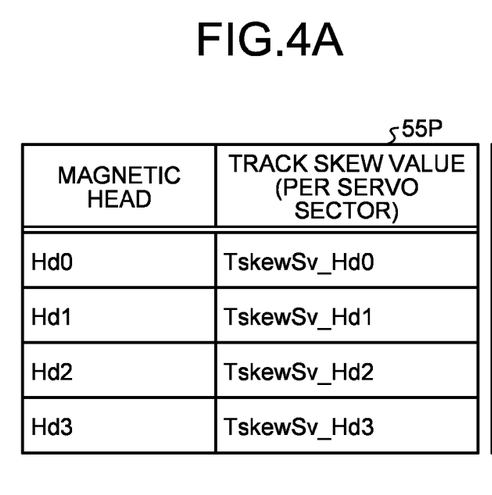
FIGS. 4A and 4B are explanatory diagrams of examples of the track skew table.
Figure 4B:
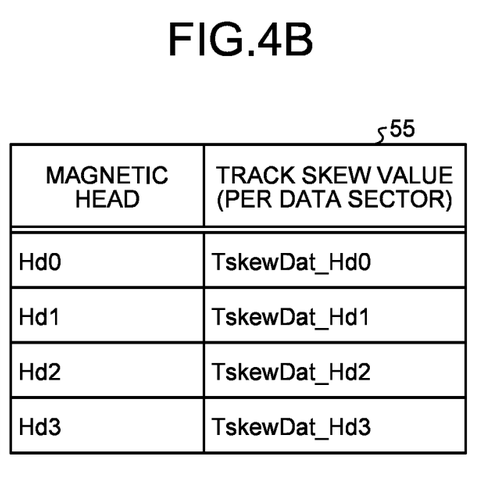
Figure 5A:
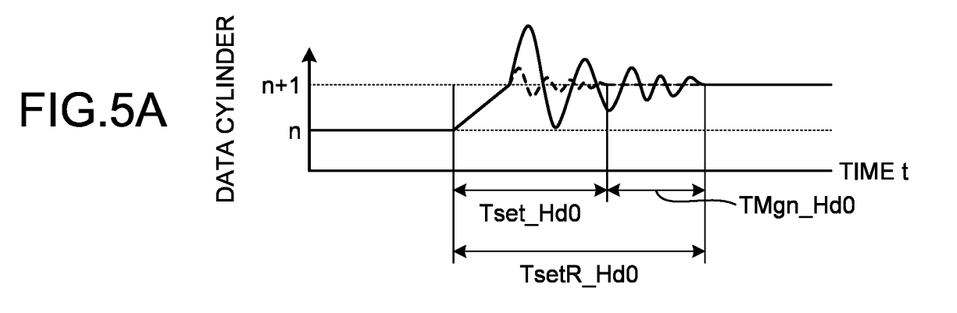
FIGS. 5A to 5D are explanatory diagrams of the method of checking a margin time in a preliminary check.
Figure 5B:
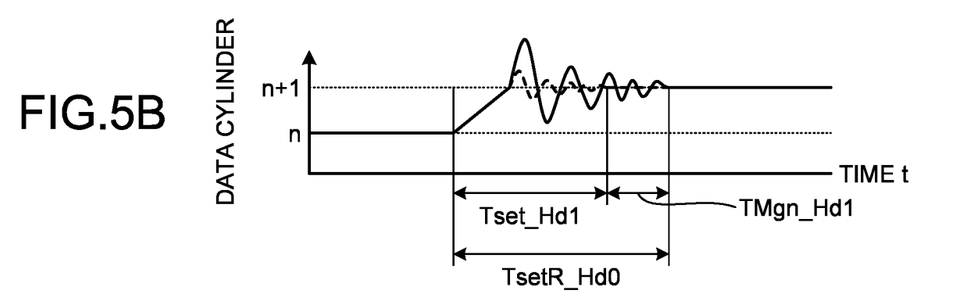
Figure 5C:
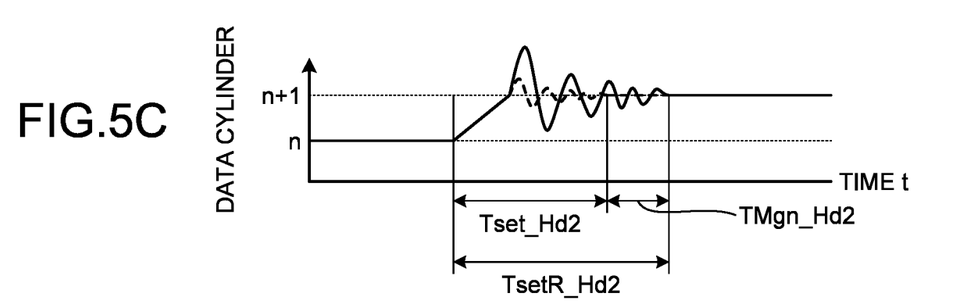
Figure 5D:
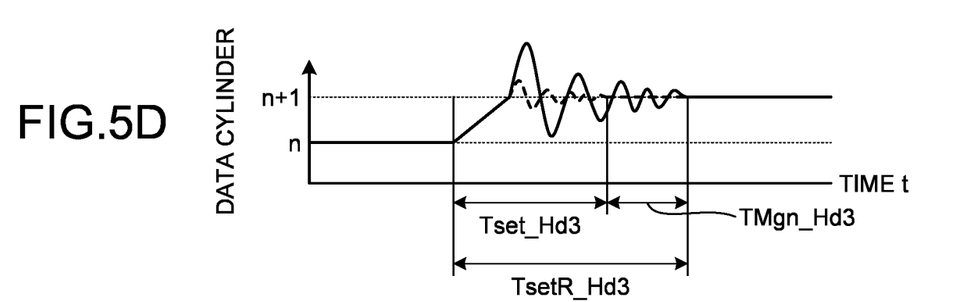

FIGS. 4A and 4B are explanatory diagrams of examples of the track skew table.

For creating the track skew table 55, as illustrated in FIG. 4A, an initial track skew table 55P is configured by acquiring track skew values $T_{skewSv\_Hd0}$ to $T_{skewSv\_Hd3}$ for every servo sector in association with the magnetic heads at the time of data generation.

Then, in the manufacturing process, the track skew values $T_{skewSv\_Hd0}$ to $T_{skewSv\_Hd3}$ of the respective servo sectors illustrated in FIG. 4A are converted into track skew values $T_{skewDat\_Hd0}$ to $T_{skewDat\_Hd3}$ of respective data sector numbers, which are stored in the non-volatile memory 51 as the track skew table 55.

Next, explanation will be given on a method of setting the track skew value Tskew in the embodiment.

First, in the preliminary check, a plurality of hard disk drives (N + 1) is prepared and operated in a vibration environment (vibration-added environment), and the optimum margin times Tmgn_Hd0, ......, and Tmgn_HdN are checked for respective magnetic heads.

FIGS. 5A to 5D are explanatory diagrams of the method of checking the margin time in the preliminary check.

In a case where there are N+1 magnetic heads, the margin times Tmgn_Hd0, ......, and Tmgn_HdN corresponding to the magnetic heads Hd0, ......, and HdN, respectively, will be checked. However, in FIGS. 5A to 5D, for the ease of understanding, it is assumed that there are four magnetic heads Hd0, ......, and Hd3 and that the margin times Tmgn_Hd0, ......, and Tmgn_Hd3 are checked.

First, in a vibration-free environment (no-vibration-added environment), the settling time, for a case where the seek is started from a data cylinder n and transferred to a data cylinder n+1 until access becomes possible, is set as a settling time Tset (= Tset_Hd0, ......, and Tset_Hd3).

Similarly, the settling time in a disturbance vibration environment in a server rack is defined as the disturbance vibration settling time TsetR (= TsetR_Hd0, ......, and TsetR_Hd3).

Then, the difference between the settling time Tset and the disturbance vibration settling time TsetR is regarded as the settling time extension due to the vibration disturbance and set as the margin times Tmgn (= Tmgn_Hd0,......, and Tmgn_Hd3).

More specifically,

Tmgn_Hd0 = TsetR_Hd0 - Tset_Hd0,
Tmgn_Hd1 = TsetR_Hd1 - Tset_Hd1,
Tmgn_Hd2 = TsetR_Hd2 - Tset_Hd2, and
Tmgn_Hd3 = TsetR_Hd3 - Tset_Hd3.

In this case, the settling time Tset and the disturbance vibration settling time TsetR have different tendencies between the inner magnetic heads positioned between the platters and the outer magnetic heads not positioned between the platters, and thus margin times Tmgn_Hd0,......, and Tmgn_Hd3 corresponding to the respective magnetic heads (magnetic head numbers) also have different values.

Note that the margin times Tmgn_Hd0,......, and Tmgn_Hd3 are different for each magnetic head; however, the margin times Tmgn_Hd0,......, and Tmgn_Hd3 are shared by all drives manufactured in the same process.

Subsequently, in an in-house inspection process, the track skew value Tskew optimized for each drive is calculated as in the conventional technology.

Subsequently, the track skew value Tskew is added to each of the margin times Tmgn_Hd0,......, and Tmgn_HdN to calculate track skew values Tsk_Hd0,......, and Tsk_N of the magnetic heads Hd0,......, and HdN, respectively.

Then, the track skew values Tsk_Hd0,......, and Tsk_N that have been calculated are stored in the track skew table 55 in the non-volatile memory 51.

Figure 6A:
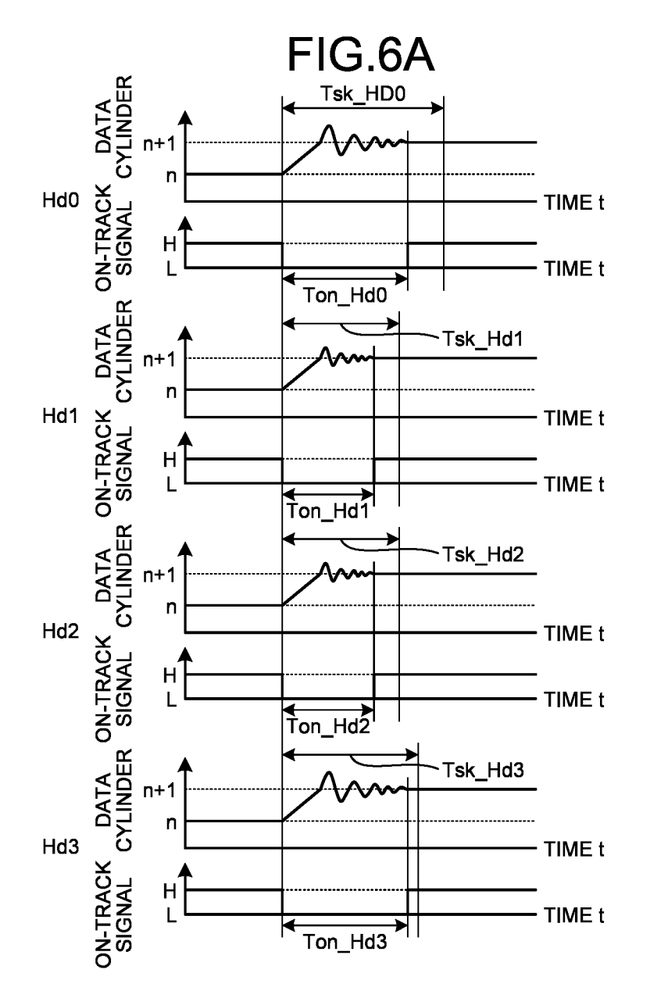
FIGS. 6A and 6B are diagrams for explaining the position history of magnetic heads in a case where the hard disk drive in which the track skew value is adjusted for every magnetic head is operated in a no-no-vibration-added environment and a vibration-added environment.
Figure 6B:
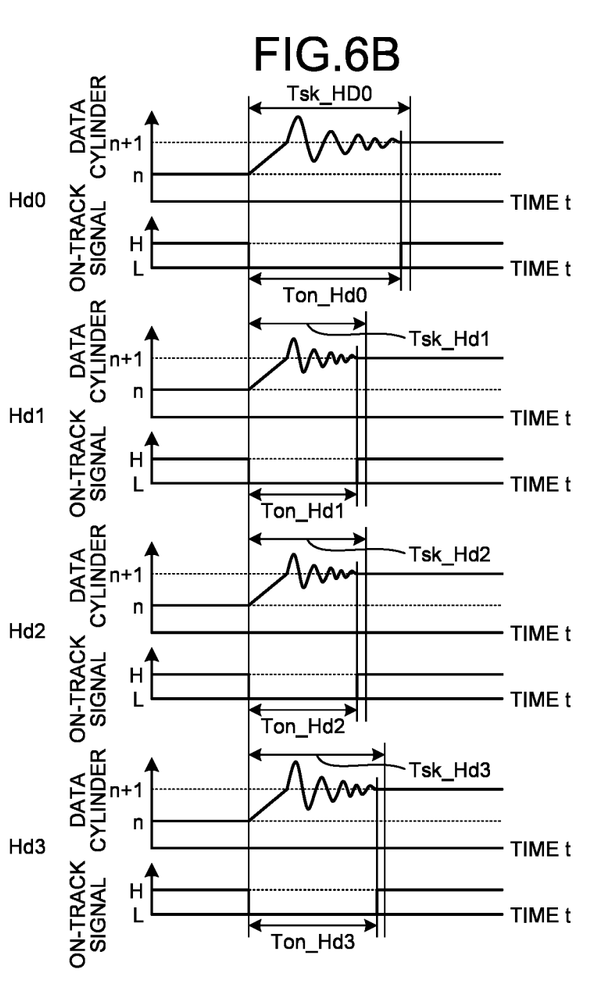

FIGS. 6A and 6B are diagrams for explaining the position history of the magnetic heads in a case where the hard disk drive in which the track skew value is adjusted for every magnetic head is operated in the no-no-vibration-added environment and the vibration-added environment.

As illustrated in FIGS. 6A and 6B, since the track skew value is set for every magnetic head, even in a case of operation in a vibration-added environment, the track skew values Tsk_Hd0,......, and Tsk_Hd3 are set to a time that is neither excessive nor insufficient with respect to the on-track times Ton_Hd0,......, and Ton_Hd3 in any magnetic head out of the magnetic heads Hd0 to Hd3. Therefore, the rotation waiting time can be reduced.

Moreover, in the first embodiment, the track skew table 55 created at the time of design or adjusted at the time of manufacture depending on the settling times is recorded in the non-volatile memory 51 in advance, and the track skew table 55 is loaded to the volatile memory 52 at the time of activation of the magnetic disk.

Then, in the hard disk control unit 40, when access to a data sector is made, the track skew reference unit 41 reads a track skew value corresponding to a head number from the track skew table 55 in the volatile memory and applies the track skew value.

Figure 7A:
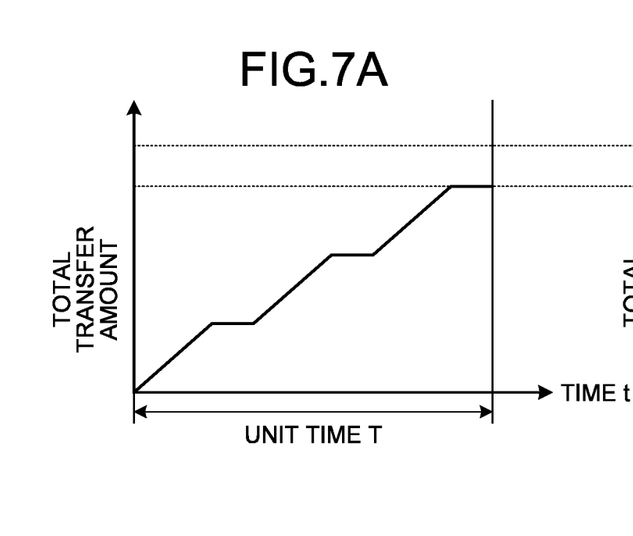
FIGS. 7A and 7B are a diagram for explaining a total data transfer amount per unit time.
Figure 7B:
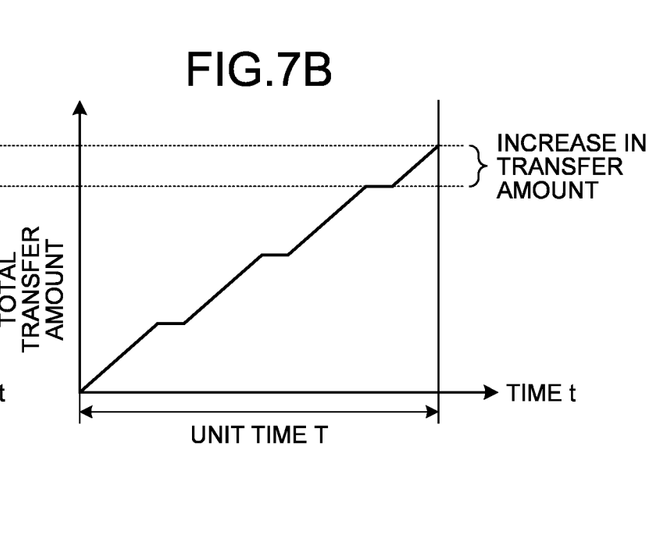

FIGS. 7A and 7B are a diagram for explaining a total data transfer amount per unit time.

In terms of unit time, the ratio of effective access time increases since the rotation waiting time is reduced (in FIGS. 7A and 7B, a time during which the transfer amount is constant), thereby leading to an increase in the transfer amount per unit time as compared to a case where the same track skew value is applied to all heads.

As described above, according to the first embodiment, in the hard disk drive including the plurality of magnetic heads, an optimum track skew value can be set to each magnetic head even in a vibration disturbance environment. In particular, even in an environment where it is mounted on a server rack and is greatly affected by vibration associated with driving of other hard disk drives, operation control can be performed using the optimum track skew value depending on the installation state of each magnetic head. Therefore, it is possible to reduce the influence of vibration disturbance as much as possible and to improve the data transfer efficiency.

Second Embodiment

Figure 8:
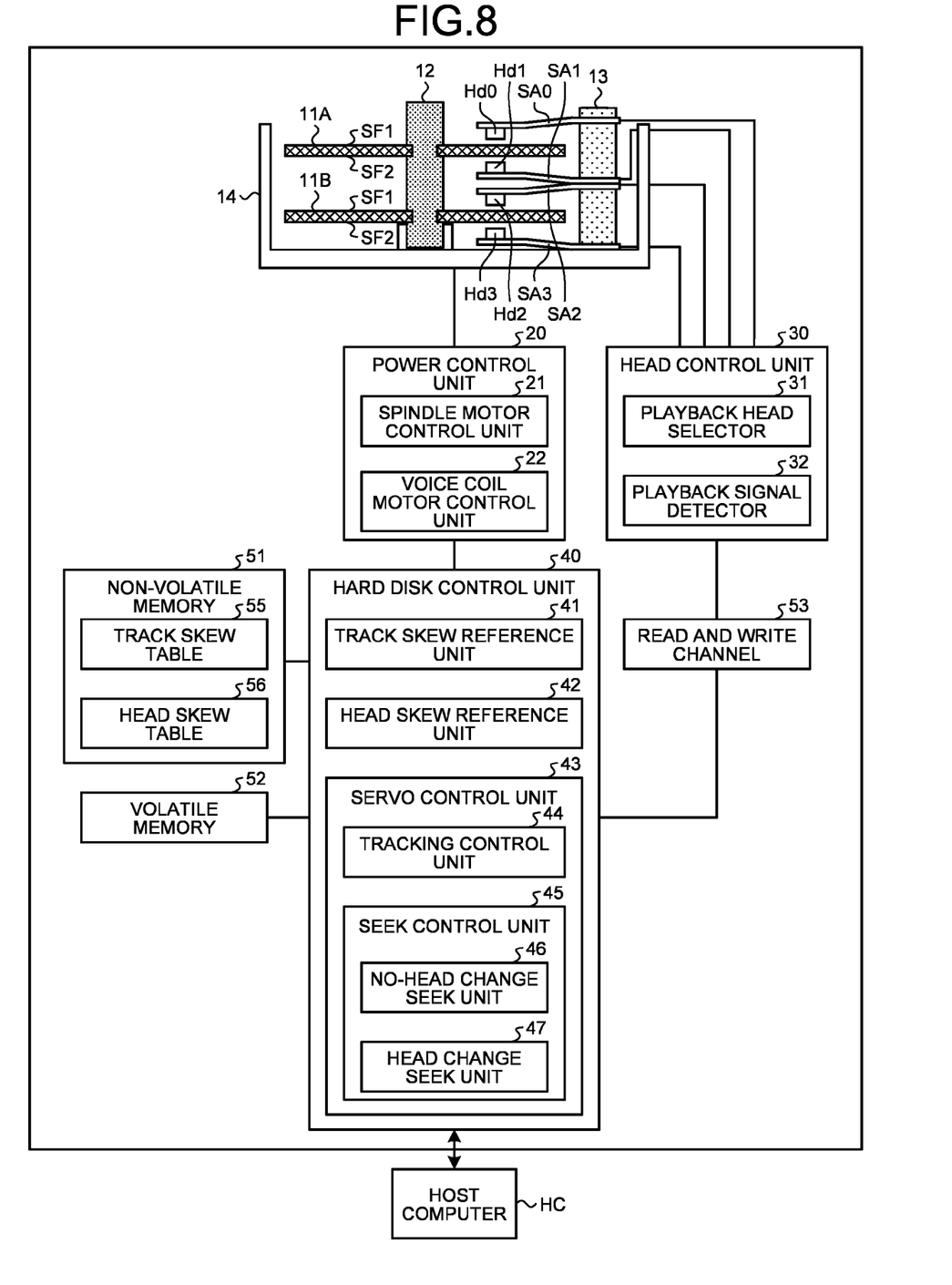
FIG. 8 is a schematic configuration block diagram of a hard disk drive according to a second embodiment.

FIG. 8 is a schematic configuration block diagram of a hard disk drive according to a second embodiment.

In FIG. 8, a component similar to that in FIG. 1 is denoted by the same reference numeral.

The second embodiment is different from the first embodiment in that it includes a head skew reference unit 42 that refers to a head skew table described later and a head skew table 56 that stores head skews in advance and that not only the track skew but also the head skew are optimized for every magnetic head.

First, let us consider an operation that ranges across zones during a sequential operation.

Figure 9:
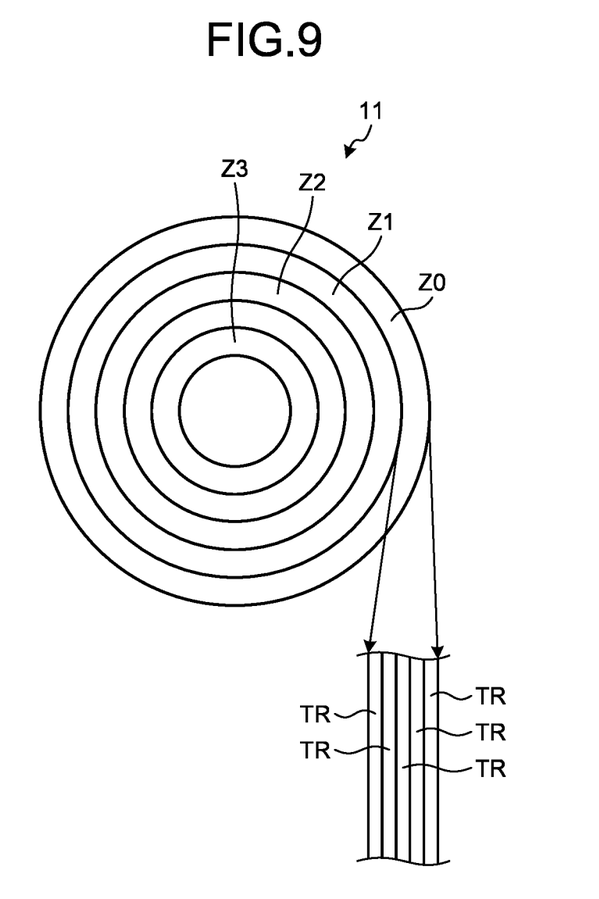
FIG. 9 is an explanatory diagram of the zone.

FIG. 9 is an explanatory diagram of the zone.

In FIG. 9, for the ease of understanding, a case where four zones Z0 to Z3 are included will be described.

Here, as illustrated in FIG. 9, the zones Z0 to Z3 are a plurality of areas arranged on the platter 11 like annual rings, and each of the zones includes a plurality of tracks TR.

Here, an exemplary structure of the head skew table will be described.

Figure 10:
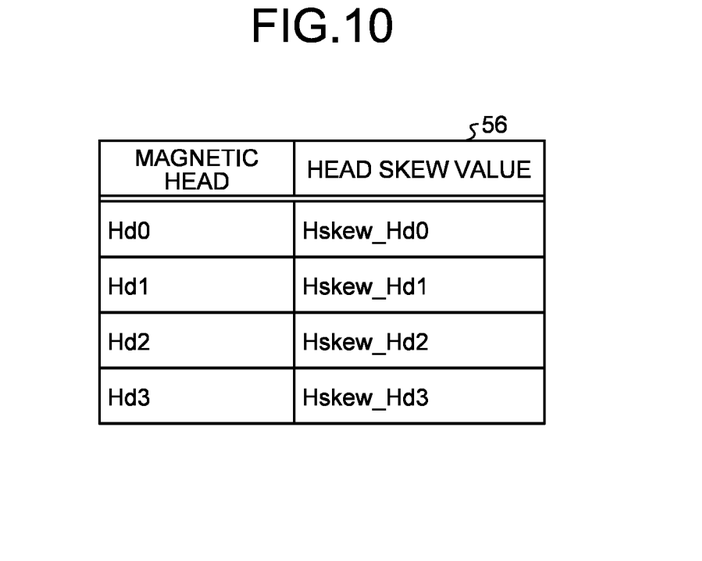
FIG. 10 is an explanatory diagram of an example of the track skew table.

FIG. 10 is an explanatory diagram of an example of the head skew table.

For the head skew table 56, as illustrated in FIG. 4A, the initial track skew table 55P is configured by acquiring track skew values $T_{skewSv\_Hd0}$ to $T_{skewSv\_Hd3}$ for every servo sector in association with the magnetic heads at the time of data generation.

Figure 11:
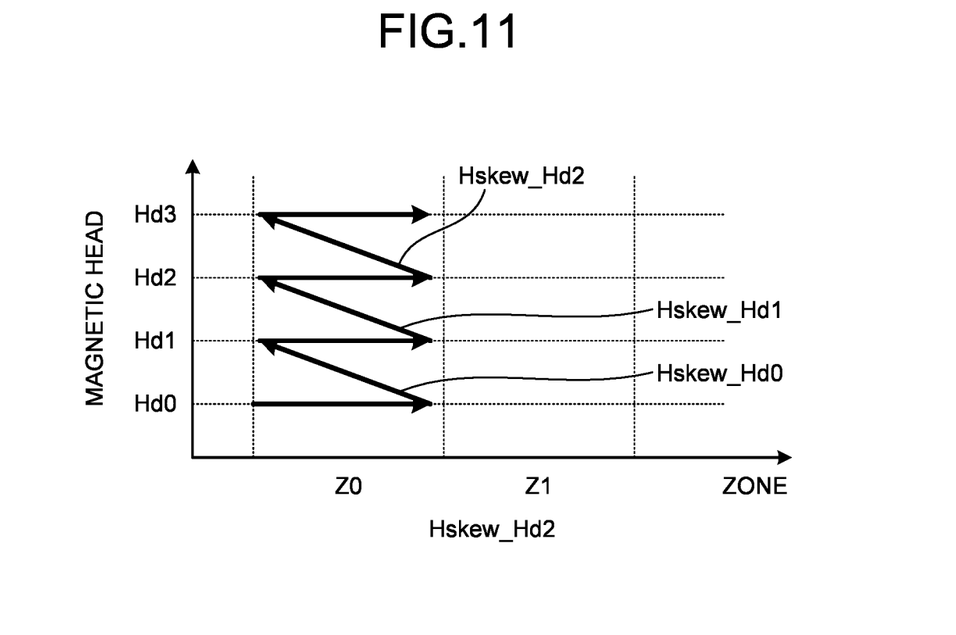
FIG. 11 is a schematic explanatory diagram of a head switching operation during a sequential operation.

FIG. 11 is a schematic explanatory diagram of a head switching operation during a sequential operation.

As illustrated in FIG. 11, in a case where a seek operation that requires switching of magnetic heads is performed in one zone (in zone Z0 in FIG. 10) during a sequential operation (hereinafter referred to as head change seek), Z-shaped access occurs. At the time of access accompanied by such switching of magnetic heads, there is a variation in the extension amount of the settling time for every magnetic head caused by vibration such as disturbance vibration.

However, since the variation in the extension amount is substantially constant for each magnetic head, by storing the head skew for the time of switching heads in the head skew table 56 as in the concept of the track skew of the first embodiment, the head skew value for each magnetic head is used instead of the track skew value for each magnetic head in the first embodiment when a head change seek occurs.

First, the head skew reference unit 42 of the hard disk control unit 40 records in advance, in the non-volatile memory 51, the head group table 55A and the track skew table 55B having been created at the time of design depending on the settling time and loads the head group table 55A and the track skew table 55B to the volatile memory 52 at the time of activation of the magnetic disk.

Then, in a case of a head change seek accompanied by switching of magnetic heads, when the hard disk control unit 40 accesses a data sector, the track skew reference unit 42 of the hard disk control unit 40 specifies magnetic heads to be operated for accessing data, refers to the head skew table 56, reads head skew values corresponding to the magnetic heads from the head skew table 56 in the volatile memory 51, and applies the head skew values.

Moreover, the track skew table 55 created at the time of design depending on the settling times is recorded in the non-volatile memory 51 in advance, and the track skew table 55 is loaded to the volatile memory 52 at the time of activation of the magnetic disk.

v Then, in a case of a normal seek not accompanied by switching of magnetic heads, when the hard disk control unit 40 accesses a data sector, the track skew reference unit 41 specifies a magnetic head to be operated for accessing data by referring to the head group table 55A, reads a track skew value corresponding to the magnetic head from the track skew table 55 in the volatile memory, and applies the track skew value.

As a result, according to the second embodiment, even in an environment where it is greatly affected by vibration associated with driving of other hard disk drives, operation control can be performed using the optimum head skew value depending on the installation state of each magnetic head when a head change seek occurs. Therefore, it is possible to further reduce the influence of vibration disturbance as much as possible and to improve the data transfer efficiency.

Modifications of Embodiments

3.1 Modification

In each of the above embodiments, the track skew value is stored in advance for each of the magnetic heads. In the above examples, the inner magnetic heads located between the platters and the outer magnetic heads not located between the platters show different tendencies, whereas the magnetic heads located closer to the outer plater and the magnetic heads located closer to the inner platter show similar tendencies, for example.

Therefore, magnetic heads having similar settling modes may be grouped together, and a track skew value may be set and stored for every group.

Figure 12A:
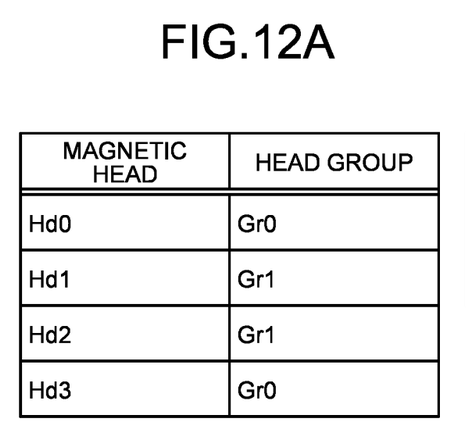
FIGS. 12A and 12B are explanatory diagrams of a case where magnetic heads having similar settling modes are grouped together and a track skew value is set for every group.
Figure 12B:
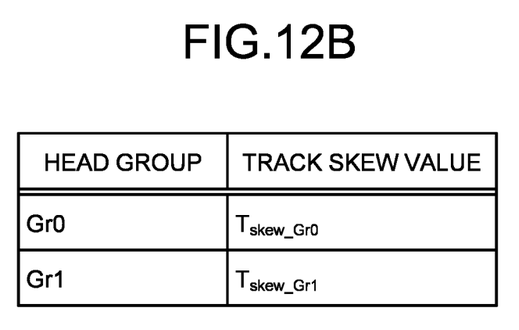

FIGS. 12A and 12B are explanatory diagrams of a case where magnetic heads having similar settling modes are grouped together and a track skew value is set to every group.

FIG. 12A is an example of a head group table.

In FIG. 12A, the head group table 55A is an example in which, of the four magnetic heads, the outer magnetic heads H$d$0 and H$d$3 are set as a first head group Gr0 and the inner magnetic heads H$d$1 and H$d$2 are set as a second head group Gr1.

FIG. 12B is an explanatory diagram of an example of the track skew table 55B in which a track skew value is assigned to every head group.

In the example of the track skew table 55B, a track skew value $T_{skew\_Gr0}$ is assigned in the head group Gr0, and a track skew value $T_{skew\_Gr1}$ is assigned in the head group Gr1.

In this case, the head group table 55A and the track skew table 55B are stored in the non-volatile memory 51 instead of the track skew table 55 in the first embodiment.

As a result, in the present modification, the head group table 55A and the track skew table 55B having been created at the time of design depending on the settling time are recorded in advance in the non-volatile memory 51, and the head group table 55A and the track skew table 55B are loaded to the volatile memory 52 at the time of activation of the magnetic disk.

Moreover, when the hard disk control unit 40 accesses a data sector, the track skew reference unit 41 of the hard disk control unit 40 specifies a magnetic head to be operated for accessing data by referring to the head group table 55A, reads a track skew value corresponding to a head group to which the magnetic head belongs from the track skew table 55B in the volatile memory, and applies the track skew value. The above embodiments and modification have described an example that the inner magnetic heads and the outer magnetic heads are separately grouped. Alternatively, the magnetic heads may be grouped according to a positional relationship between the magnetic heads and the housing 14.

According to the present modification, it is possible to simplify the control and to reduce the memory capacity while achieving similar effects as those of each of the above embodiments.

3.2 Other Modifications

Note that a program executed by a hard disk control device of the present embodiment is provided by being incorporated in a ROM or the like in advance.

The program executed by a hard disk device of the present embodiments may be configured to be provided by being recorded, as a file in an installable format or an executable format, in a computer-readable recording medium such as a semiconductor memory device such as a USB memory or an SSD, or a digital versatile disk (DVD).

Alternatively, the program executed by a hard disk control device of the present embodiments may be stored in a computer connected to a network such as the Internet and provided by being downloaded via the network. Further alternatively, the program executed by a device of the present embodiment may be configured to be provided or distributed via a network such as the Internet.

The program executed by a hard disk control device of the present embodiments has a module configuration including the units (control units) described above, and as an actual hardware, with a CPU (processor) reading the program from the ROM and executing the program, the control units are loaded on the main storage device and thereby generated.

While certain embodiments have been described, these embodiments have been presented by way of example only, and are not intended to limit the scope of the inventions. Indeed, the novel methods and systems described herein may be embodied in different other forms; furthermore, various omissions, substitutions and varies in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic disk device comprising:
a plurality of magnetic heads;
a storage unit that stores a table storing, for the magnetic heads, track skew values obtained by adding a unique value and shared values respectively corresponding the magnetic heads, the shared values being predetermined and shared among magnetic disk devices including the magnetic disk device, and the unique value being optimized for the magnetic disk device; and
a control unit that reads out among the track skew values, a track skew value corresponding to one of the magnetic heads to be operated from the table and performs seek control.

2. The magnetic disk device according to claim 1,
wherein the track skew value is stored in a unit of data sector or servo sector.

3. The magnetic disk device according to claim 1,
wherein the shared values are is set based on a measured value of a settling time under a vibration-free environment, and
the unique value is set based on a settling-time extension value obtained in advance as a result of operating a different set of magnetic heads under a vibration environment.

4. The magnetic disk device according to claim 1,
wherein the plurality of magnetic heads is grouped into groups of magnetic heads having similar settling modes,
the storage unit stores the table storing a track skew value of each of the groups, and
the control unit reads, from the table, the track skew value corresponding to the group to which the magnetic head to be operated belongs and performs seek control.

5. The magnetic disk device according to claim 4,
wherein the plurality of magnetic heads is grouped according to a positional relationship between the magnetic heads and a housing of the magnetic disk device.

6. The magnetic disk device according to claim 4,
wherein the plurality of magnetic heads are sorted into a group of magnetic heads having shorter lengths of settling time and a group of magnetic heads having longer lengths of settling time.

7. The magnetic disk device according to claim 1,
wherein the storage unit stores a table storing a head skew value for each of the magnetic heads, and
in a case where seek control involving a change of the magnetic heads is included, the control unit reads the head skew value corresponding to a magnetic head to be operated from the head skew table and performs seek control.

8. A control method of a magnetic disk device, to be executed by the magnetic disk device comprising a plurality of magnetic heads and a storage unit that stores a table storing, for the magnetic heads, track skew values obtained by adding a unique value and shared values respectively corresponding the magnetic heads, the shared values being predetermined and shared among magnetic disk devices including the magnetic disk device, and the unique value being optimized for the magnetic disk device, the control method comprising:
reading, among the track skew values, a track skew value corresponding to one of the magnetic heads to be operated from the table; and
performing seek control of the corresponding magnetic head on a basis of the track skew value that has been read.

9. A non-transitory computer-readable storage medium storing a program for causing a computer to control a magnetic disk device comprising a plurality of magnetic heads and a storage unit that stores a table storing, for the magnetic heads, track skew values obtained by adding a unique value and shared values respectively corresponding the magnetic heads, the shared values being predetermined and shared among magnetic disk devices including the magnetic disk device, and the unique value being optimized for the magnetic disk device, the program causing the computer to perform:
reading, among the track skew values, a track skew value corresponding to one of the magnetic heads to be operated from the table; and
performing seek control of the corresponding magnetic head on a basis of the track skew value that has been read.

* * * * *